ASSEMBLIES OF SUPERCONDUCTOR ELEMENTS

Filed May 4, 1967

INVENTORS
PETER HARLOW MORTON
ANTHONY CLIFFORD BARBER

BY Cushman, Darby & Cushman
ATTORNEYS 3,472,944

ASSEMBLIES OF SUPERCONDUCTOR ELEMENTS

Peter Harlow Morton, Solihull, and Anthony Clifford Barber, Lichfield, England, assignors to Imperial Metal Industries (Kynoch) Limited, Birmingham, Warwickshire, England, a corporation of Great Britain Filed May 4, 1967, Ser. No. 636,203
Claims priority, application Great Britain, May 20, 1966, 22,581/66
Int. Cl. H01b 7/34
U.S. Cl. 174—15 8 Claims

ABSTRACT OF THE DISCLOSURE

An assembly of at least one superconductor element embedded within the wall of a tube of at least one non-superconductor matrix material.

BACKGROUND OF THE INVENTION

This invention relates to superconductor assemblies and to methods of manufacture of such assemblies. The term "superconductor element" as used in the specification means a wire, ribbon or filament of a material capable of exhibiting superconducting properties below a critical temperature, typically a few degrees Kelvin, either in its present form or after a suitable heat-treatment.

SUMMARY OF THE INVENTION

In accordance with the invention a superconductor assembly comprises a tube of at least one non-superconductor matrix material which is provided with a superconductor element.

Preferably the superconductor element is wholly enclosed within the matrix material.

In accordance with the invention also a superconductor assembly comprises a tube of at least one non-superconductor matrix material within the wall of which is at least partially embedded a plurality of superconductor elements.

Preferably said at least one non-superconductor matrix material is an electrical conductor, or are electrical conductors. If only one matrix material is involved it is preferably high conductivity copper, but aluminium, silver, lead or solder are also possible as are combinations thereof or with copper.

The inner surface of the tube can be formed with a plurality of longitudinally extending corrugations whereby the area of said inner surface is increased; the corrugations can be discontinuous and irregular.

Preferably further, the external cross-sectional shape of the tube is circular, rectangular or hexagonal, and the internal and external cross-sectional shapes are similar to one another.

In accordance with the invention also, a method of manufacturing a superconductor assembly comprises locating at least one superconductor element in annular formation within a tube of a non-superconductor matrix material to form an assembly and extruding the latter to form an integral tube of superconductor and matrix materials.

In accordance with the invention also a method of manufacturing a superconductor assembly comprises forming a plurality of bars of a non-superconductor matrix material each containing at least one superconductor element, locating a number of the bars parallel to one another in annular formation within a tube of said or another matrix material to form an assembly, and extruding the latter to form an integral tube containing the superconductor elements embedded within its wall.

Preferably a further tube of a non-superconductor matrix material is located within and provides the inner boundary of the annular formation, and forms part of the assembly which is extruded to produce the integral tube. Preferably also, to reduce the cross-sectional dimensions of the tube to the required levels, the integral tube is drawn through at least one die whilst containing a floating plug to retain the opening through the tube.

Preferably further the tube is processed to provide an external cross-sectional shape which is circular, rectangular or hexagonal.

The drawn tube may be operated upon to corrugate its internal surface; the corrugations can be discontinuous and irregular.

The invention also consists in a tube manufactured in accordance with the method specified in any of the five next preceding paragraphs.

Preferably in the assembly or the method of manufacture specified in any of the preceding paragraphs, the superconductor element is a ductile superconductor material such as, as an example, an alloy of niobium and titanium, typically 30–50 wt. percent titanium, remainder niobium, or, as an example, is an alloy of niobium and zirconium. If required, the superconductor element can be an alloy of niobium and tin, the finished tube being subjected to a heat-treatment to produce the compound $Nb_3Sn$ which exhibits the required superconductor characteristics below its critical temperature.

BRIEF DESCRIPTION OF THE DRAWINGS

Typical examples of the invention will now be more particularly described with reference to the accompanying diagrammatic drawings, in which.

In all of the drawings the superconductor material is shown shaded for ease of identification.

DESCRIPTION OF THE PREFERRED EMBODIMENTS

In a first typical example of the invention an ingot of the alloy niobium, 44 wt. percent titanium, is melted and is forged at 400 to 1000° C. to form a slab, and is quenched from 1000° C., although quenching is not essential. The slab is rod-rolled, or can be swaged or forged, at ambient temperatures to form a bar.

Figure 1:
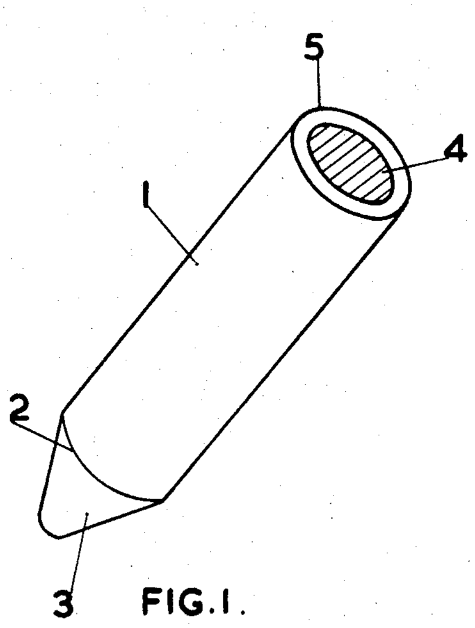
FIGURE 1 is a perspective view of a copper extrusion can containing a bar of a superconductor alloy.

Referring to FIGURE 1, a can 1 of high conductivity copper to serve as the matrix material is prepared, in which the can 1 has one closed end 2 on to which is formed a nose 3 for use in extrusion. The interior dimensions of the can are such that it closely receives the bar of the superconductor alloy. Thus the bar is inserted into the copper can 1 as shown in FIGURE 1 with the bar denoted by the numeral 4. The assembly produced is preferably provided with a lid (not shown) closing the open end 5 of the can, evacuated, and is then extruded at 300 to 450° C. to form an extruded bar. The extrusion is then drawn at ambient temperatures, or can be rod-rolled and drawn, or swaged and drawn, to a particular cross-sectional shape. Drawing can be carried out instead of extrusion.

The cross-sectional shape to be selected will depend upon the drawing facilities available, and upon the shape convenient for assembly into annular configuration, as more particularly described in the following paragraph.

Figure 2:
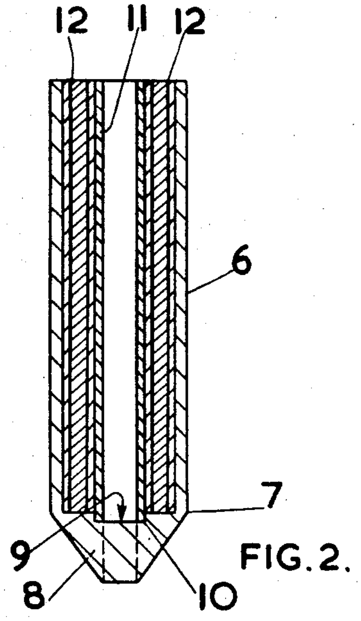
FIGURE 2 is a sectional view taken along the line 2—2 of FIGURE 3 of an assembly of a further copper extrusion can containing a copper tube and a number of extruded and drawn or drawn bars of copper and superconductor.
Figure 3:
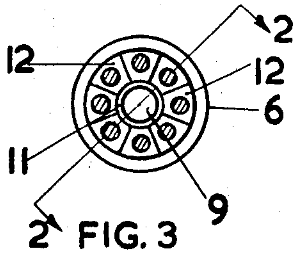
FIGURE 3 is a plan view of the assembly shown in FIGURE 2.

A further can 6, shown in FIGURES 2 and 3, is prepared by machining from a solid copper cylinder or by fabrication of copper sheet, the can again having one closed end 7 on which is formed a nose cone 8 for use in extrusion. The interior of said closed end 7 can be formed with a shallow circular depression 9 or an annular groove (not shown) for receiving one end 10 of a copper tube 11 to hold it concentric with the copper can 6. Possibly the recess or groove may be omitted. The annular space between the tube 11 and the copper can 6 is then filled with a number of the extruded and drawn or drawn bars denoted by the numeral 12. If each bar 12 is of cross-sectional shape such that it is a section of an annulus with right-angled corners, as shown in FIGURE 3, the bars 12 are dimensioned so as to fit tightly against one another around and within the annular space and parallel to one another. In this example only a single row of bars is used, although a number of rows can be used if required. If the bars are of a square cross-section (not shown) they will not fit so neatly within the annular space, and the gaps between the bars can be approximately filled with copper strips or wires. In this way an assembly of the copper can 6, the copper tube 11 and the bars 12 is produced.

The tube 11 is preferably sealed, e.g. by welding, to the closed end 7 of the can 6, and the can 6 provided with an annular lid (not shown) sealing in the bars 12. The assembly can then be evacuated and sealed if required, and is extruded at 150 to 450° C. to form an integral tube, the interior shape of the copper tube 11 being maintained by means of a mandrel on the extrusion ram; the mandrel fits within the copper tube 11 prior to extrusion, and it is around the mandrel that extrusion takes place. If required the nose 8 on the copper can 6 can be drilled to continue the bore of the copper tube 11 as shown in dashed lines in FIGURE 2, through the nose, whereupon the mandrel is arranged to pass through the nose 8, as well as the copper tube 11 prior to extrusion. However, this is not necessary.

The extruded tube is then drawn or tube reduced at ambient temperatures down to the required cross-sectional dimensions. The drawing is carried out with the technique of a floating plug to maintain the bore of the tube. Although this technique is well known to those skilled in the art. so that it is not illustrated in the accompanying drawings, the process briefly is that a floating plug is inserted into the end of the tube and is retained approximately in position by means of an expedient such as a wire, a portion of the tube between the end and the plug is swaged to the reduced diameter and is passed through a die, and the tube is then drawn through the die. As drawing commences the plug is maintained by tension on the wire as close to the die as possible, and once drawing has commenced the friction of the interior of the tube will maintain the plug in position so that the wire can be released. The floating plug maintains the interior of the tube approximately of circular cross-section; if the floating plug were to be omitted and the tube were simply to be drawn through the die the first effect would be distortion of the inner wall of the tube.

Figure 4:
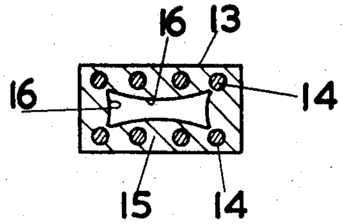

The tube is drawn as many times as are required until it achieves the required final dimensions at which time it may well be of the order of 1000 ft. long. The tube is then shaped to the required cross-sectional shape, and this can be done either by floating plug drawing with a rectangular plug through a rectangular die, whereby the interior and exterior surfaces of the wire become rectangular, or by drawing through a Turk's-head die or rolling to produce a rectangular external shape, the interior of the wire then taking an approximately rectangular formation with four convex walls, or the whole of the drawing steps can be carried out with rectangular floating plugs and dies. FIGURE 4 shows a wire 13 of rectangular external profile in which the super conductor elements 14 can be seen in the copper matrix 15. The inner surface of the tube has the four convex walls 16 just described.

Figure 5:
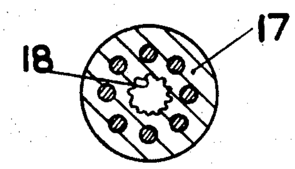
FIGURES 4–5 are cross-sectional views of first, second and third superconductor assemblies respectively on a very much larger scale than that of FIGURES 1–3.

Preferably a final draw or roll is carried out with no plug within the wire whereby the resulting compression produces longitudinally extending corrugations which are irregular and discontinuous. By this means the area of the external surfaces of the wire is increased by a factor approaching 2. This is shown in FIGURE 5 in which the wire 17 is cylindrical, and the inner surface has the corrugations 18.

In use the wire described above is wound to form the windings of magnets for use below the critical temperature of the superconductor elements. To maintain the wire below its critical temperature, liquid helium or helium gas is pumped through or through and around the interiors of the wires, whereby efficient cooling is effected. In addition the large surface areas of these interiors provided by the corrugations may assist in rapid heat transfer from the superconductor elements through the matrix material to the liquid helium. This can be contrasted with a prior proposal of maintaining the temperature of the winding of the magnet below the critical temperature simply by immersion of the winding en bloc within liquid helium. In this prior proposal any heat generated within the winding must travel by conduction to the exterior of the winding before it can be removed, and gaps or grooves between the coils of the wire have been found to be inefficient in assisting in cooling. By means of the invention it is believed that the temperature of the whole of the winding can be maintained below the critical temperature in a reliable and efficient manner.

In the typical example described above, each bar inserted in the annular space between the copper can and the copper tube contains only a single superconductor element. If required those bars can be drawn into a hexagonal or other shape, and a number of the bars can then be fitted together into a copper tube. The copper tube is then either rod-rolled or swaged or extruded followed by drawing at ambient temperatures to the particular cross-sectional shape such as a part of an annulus or a square. These bars are then fitted into the annular spacing between the can 6 and the tube 11 as before, but in this case each bar contains a plurality of superconductor elements.

Figure 6:
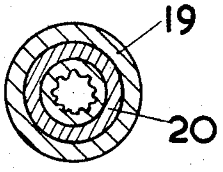

In another typical example of the invention, to which FIGURE 6 relates, a superconductor assembly wire 19 is produced in which there is a single tubular superconductor element 20 wholly embedded within a high conductivity copper matrix and extending around the tubular wire 19. The wire 19 is produced by a method analogous to that described with reference to FIGURES 2 and 3, the extrusion can 6 is provided with the copper tube 11, and the annular space therebetween is filled with a tubular superconductor element prepared by extrusion or by bending the element in sheet form to bring two of its opposed edges into abutment, followed by welding to form a tube. The assembly of can 6, tube 11 and superconductor element is then extruded and drawn with the use of the floating plug. A final operation produces the same corrugations as those of FIGURE 5.

Although the invention has been described with reference to the alloy niobium, 44 wt. percent titanium, other niobium-titanium alloys which are superconductors can also be used, as can superconductor alloys of niobium and zirconium. Any modifications which are necessary to the described sequence of processes for producing the final tube consequent to the use of zirconium instead of titanium as an alloying constituent will be obvious to a man skilled in the art. A further possibility is the use of $Nb_3Sn$ as a superconductor element, but this poses particular difficulties because of the brittleness of this compound. Consequently the sequence of processes described above in relation to FIGURES 1–5 is modified in that the bars to be inserted in the annular space between the copper can 6 and the copper tube 11 are produced by the use of a niobium tube which is filled with tin or with a mixture of powders of tin and niobium and has its ends sealed to fully enclose the tin, and which is then inserted in the copper can 1. The assembly of the can 1 of copper and the tube of niobium and the sealed cylinder of tin is then extruded and drawn as before to produce a bar of the required cross-sectional shape in which the niobium and tin have diffused into one another to a certain extent, although the niobium still fully contains the tin and is sheathed in the copper. These bars are then fitted into the annular space as before, and the sequence of processes then continues as described above. Throughout the sequence, however, care is taken to ensure that the temperature does not exceed the temperature at which $Nb_3Sn$ is formed, so as to avoid the brittleness of $Nb_3Sn$. However, when the final tubular wire has been formed, it is then subjected to heat-treatment for 10 minutes to 3 hours at 1000–950° C. to effect the production of $Nb_3Sn$ in the zones of niobium into which tin has diffused and of tin into which niobium has diffused, to form the superconductor material $Nb_3Sn$.

The modifications necessary to use $Nb_3Sn$ as the superconductor material in the wire of FIGURE 6 will be apparent from the above paragraph.

In other modifications of the invention, either instead of copper being used as the matrix, or instead of solely copper being used, aluminum and/or silver can be used as the matrix material. Thus the bars which were described as being packed into the annular space between a copper tube and a copper can, can in fact be packed into the space between an aluminum tube and an aluminum can. The choice of the matrix material to be used in any particular circumstances will be obvious to the man skilled in the art, the characteristics to be borne in mind being firstly the cost of the matrix material, secondly its heat conduction properties which should be good, thirdly its electrical conduction properties which similarly should be good, fourthly its magneto resistance which should be low, and fifthly its mechanical properties which will be of importance in the extrusion and drawing processes in the production of the tubular wire.

In another modification, the inner tube 11 which partly defined the annular space can be omitted, the bars packed into the annular space maintaining themselves in position either alone or with the use of a thin covering or a graphite plug removed just prior to insertion of the mandrel on the extrusion ram.

We claim:

1. A superconductor assembly comprising at least one element of a material which is superconducting at temperatures below its critical temperature, and a matrix of a thermally and electrically conductive material which is not superconducting at said critical temperature within which is at least partially embedded said element, the improvement comprising providing the assembly in hollow tubular form whereby fluid coolant can be passed through the hollow interior of the tubular form to maintain the temperature of said element below said critical temperature.

2. A superconductor assembly according to claim 1 wherein there are provided a plurality of said elements of a material which is superconducting at temperatures below its critical temperature.

3. A superconductor assembly according to claim 1 wherein an inner surface of the hollow tubular form is provided with a plurality of longitudinally extending corrugations.

4. A superconductor assembly according to claim 1 wherein there is a single thermally and electrically conductive material which is not superconducting at said critical temperature, this material being high conductivity copper.

5. A superconductor assembly according to claim 1 wherein said thermally and electrically conductive material which is not superconducting at said critical temperature is selected from the group consisting of copper, aluminum, silver and lead.

6. A superconductor assembly according to claim 1 wherein said material which is superconducting at temperatures below its critical temperature is a superconductor alloy of niobium with a metal selected from the group consisting of titanium and zirconium.

7. A superconductor assembly according to claim 1 wherein said material which is superconducting at temperatures below its critical temperature is an alloy of niobium and tin, heat treated to produce the compound $Nb_3Sn$.

8. An electrical power conducting assembly including at least one superconducting member formed of a material which is superconducting at temperatures below a critical temperature for that material, said assembly comprising a tube having a bore defined by a wall of thermally and electrically conducting material which is not superconducting at said critical temperature, said superconducting member being at least partially embedded in the material of said wall and extending longitudinally of said wall, and means for maintaining said superconducting member below said critical temperature, said means including means for passing a cooling fluid through the bore of said tube.

References Cited

UNITED STATES PATENTS

| | | | |
|---|---|---|---|
| 3,014,139 | 12/1961 | Shildneck | 174—15 X |
| 3,162,716 | 12/1964 | Silver. | |
| 3,185,756 | 5/1965 | Allison | 174—15 X |
| 3,306,972 | 2/1967 | Laverick et al. | |

OTHER REFERENCES

Cline et al.: Superconductivity of a Composite of Fine Niobium Wires in Copper, in Journal of Applied Physics, vol. 37, No. 1, January 1966, pp. 5–8.

ELLIOT A. GOLDBERG, Primary Examiner

U.S. Cl. X.R.

174—126, 128, 130; 335—216

Notice of Adverse Decision in Interference

In Interference No. 97,170 involving Patent No. 3,472,944, P. H. Morton and A. C. Barber, ASSEMBLIES OF SUPERCONDUCTOR ELEMENTS, final judgment adverse to the patentees was rendered Aug. 30, 1972, as to claims 1, 2, 4, 5, 7 and 8.

[*Official Gazette February 6, 1973.*]